(12) United States Patent
Marvit

(10) Patent No.: US 8,791,977 B2
(45) Date of Patent: Jul. 29, 2014

(54) METHOD AND SYSTEM FOR PRESENTING METADATA DURING A VIDEOCONFERENCE

(75) Inventor: David Marvit, San Francisco, CA (US)

(73) Assignee: Fujitsu Limited, Kawasaki-shi (JP)

( * ) Notice: Subject to any disclaimer, the term of this patent is extended or adjusted under 35 U.S.C. 154(b) by 191 days.

(21) Appl. No.: 12/898,407

(22) Filed: Oct. 5, 2010

(65) Prior Publication Data

US 2012/0081506 A1 Apr. 5, 2012

(51) Int. Cl.
*H04N 7/14* (2006.01)
(52) U.S. Cl.
USPC ........................................ 348/14.01; 704/273
(58) Field of Classification Search
USPC .................. 348/14.01–14.09, 14.11; 382/278
See application file for complete search history.

(56) References Cited

U.S. PATENT DOCUMENTS

| 5,710,591 | A | 1/1998 | Bruno et al. | |
|---|---|---|---|---|
| 6,377,995 | B2 | 4/2002 | Agrahaaram et al. | |
| 7,046,779 | B2 | 5/2006 | Hesse | |
| 7,099,448 | B1 | 8/2006 | Laniepce | |
| 7,113,201 | B1 | 9/2006 | Taylor et al. | |
| 7,185,054 | B1 | 2/2007 | Ludwig et al. | |
| 7,953,219 | B2* | 5/2011 | Freedman et al. | 379/265.06 |
| 7,970,115 | B1 | 6/2011 | Coughlan et al. | |
| 8,219,404 | B2* | 7/2012 | Weinberg et al. | 704/273 |
| 2003/0081751 | A1 | 5/2003 | Berstis | |
| 2003/0125954 | A1 | 7/2003 | Bradley et al. | |
| 2003/0169330 | A1 | 9/2003 | Ben-Shachar et al. | 348/14.09 |
| 2004/0021765 | A1* | 2/2004 | Kubala et al. | 348/14.08 |
| 2004/0039464 | A1 | 2/2004 | Virolainen et al. | 700/94 |
| 2004/0083104 | A1 | 4/2004 | Liu et al. | |
| 2005/0028194 | A1* | 2/2005 | Elenbaas et al. | 725/32 |
| 2005/0084086 | A1 | 4/2005 | Hesse | |
| 2006/0055771 | A1 | 3/2006 | Kies | 348/14.03 |
| 2007/0136671 | A1 | 6/2007 | Buhrke | |
| 2007/0188599 | A1 | 8/2007 | Kenoyer | |
| 2008/0130525 | A1 | 6/2008 | Jansen et al. | |
| 2009/0048939 | A1 | 2/2009 | Williams | 705/26 |
| 2009/0232032 | A1 | 9/2009 | Kelley | |
| 2009/0319267 | A1 | 12/2009 | Kurki-Suonio | |
| 2010/0031146 | A1* | 2/2010 | Finkelstein et al. | 715/716 |
| 2010/0081116 | A1 | 4/2010 | Barasch et al. | |
| 2010/0085415 | A1 | 4/2010 | Rahman | |
| 2010/0199189 | A1* | 8/2010 | Ben-Aroya et al. | 715/736 |
| 2011/0093266 | A1* | 4/2011 | Tham | 704/246 |
| 2011/0096135 | A1* | 4/2011 | Hegde et al. | 348/14.07 |
| 2011/0217021 | A1* | 9/2011 | Dubin et al. | 386/278 |
| 2011/0279639 | A1* | 11/2011 | Anand et al. | 348/14.09 |
| 2012/0030244 | A1* | 2/2012 | John et al. | 707/797 |

OTHER PUBLICATIONS

U.S. Appl. No. 12/872,268, filed Aug. 31, 2010, 30 pages.
U.S. Appl. No. 12/872,319, filed Aug. 31, 2010, 34 pages.
Office Action Summary received from the USPTO for U.S. Appl. No. 12/872,319, filed Aug. 31, 2010 for Inventor: Marvit, Feb. 1, 2013.
Office Action Summary received from the USPTO for U.S. Appl. No. 12/872,319, filed Aug. 31, 2010 for Inventor: Marvit, Jun. 28, 2012.

* cited by examiner

*Primary Examiner* — Maria El-Zoobi
(74) *Attorney, Agent, or Firm* — Baker Botts L.L.P.

(57) ABSTRACT

A method for presenting metadata during a video conference includes receiving a first video conferencing stream from a first site. Metadata associated with the first video conferencing stream is identified. A second video conferencing stream incorporating the identified metadata is created using a processor. The second video conferencing stream is presented at a second site.

21 Claims, 2 Drawing Sheets

METHOD AND SYSTEM FOR PRESENTING METADATA DURING A VIDEOCONFERENCE

TECHNICAL FIELD

This invention relates generally to the field of communications and more specifically to a method and system for presenting metadata during a videoconference.

BACKGROUND

Videoconferencing technology allows for individuals in disparate locations to communicate with one another. Videoconferencing provides an experience that simulates with varying degrees of success the manner in which individuals communicate in person. The emulation of in-person communication may be limited by the videoconferencing equipment used and the fact that participants may be in separate locations. The equipment used and the disparate locations of the participants, however, may provide an opportunity to surpass the experience provided during in-person communication.

SUMMARY OF THE DISCLOSURE

In accordance with the present invention, disadvantages and problems associated with previous techniques for implementing videoconferences may be reduced or eliminated.

According to one embodiment of the present invention, a method for presenting metadata during a video conference includes receiving a first video conferencing stream from a first site. Metadata associated with the first video conferencing stream is identified. A second video conferencing stream incorporating the identified metadata is created using a processor. The second video conferencing stream is presented at a second site.

Certain embodiments of the invention may provide one or more technical advantages. A technical advantage of one embodiment may include presenting information associated with a videoconference as metadata to videoconferencing participants. The metadata may be identified automatically before the video conference and/or during the videoconference. The identified metadata may be presented to the participants during the video conference and updated in real-time. The metadata may encompass any of a range of possible information, which may come from any suitable source.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
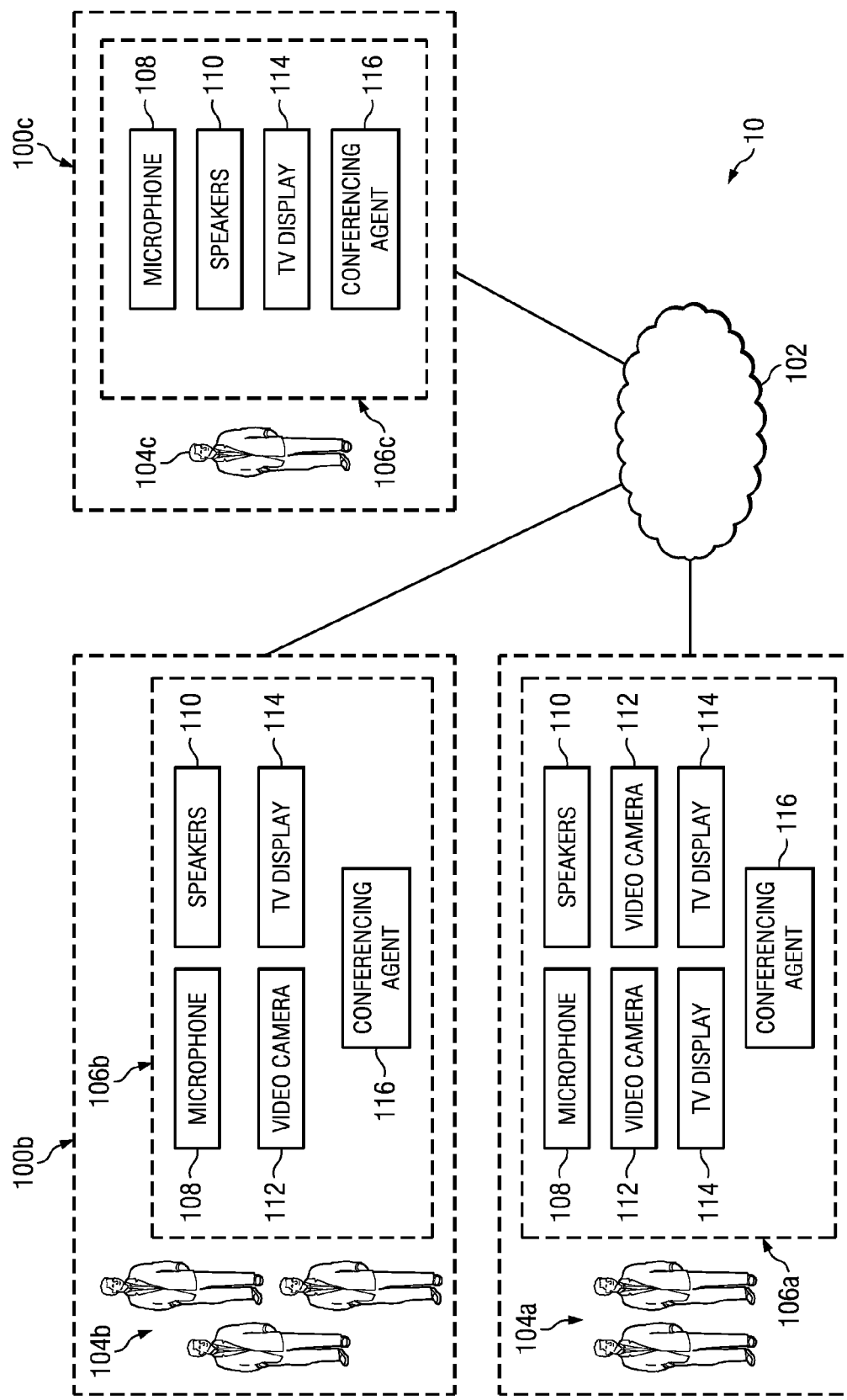
FIG. 1 illustrates an embodiment of a system operable to allow videoconferencing among various sites.

FIG. 1 illustrates an embodiment of a system 10 operable to allow videoconferencing among various sites. In certain embodiments, several sites 100 participate in a videoconference through network 102 using videoconferencing equipment 106. Sites 100 may include any suitable number of participants 104 who participate in the video conference. For a particular site 100, system 10 facilitates the presentation of videoconferencing streams from other sites 100 along with certain identified metadata associated with those video conferencing streams. As described in more detail in the discussion that follows, identified metadata may include the name, business, credentials, or location of a person participating in a video conference, as non-limiting examples.

A videoconferencing stream may include any data signals, which, when rendered by videoconferencing equipment 106, form a representation of data captured at a particular site 100. For example, videoconferencing streams may include video and/or audio signals. Videoconferencing streams may be captured at a particular site 100 and displayed at other sites 100 relatively quickly after they are captured, i.e. in real-time. A particular site 100 may also identify metadata associated with a received videoconferencing stream. Functionality at the receiving site 100 may combine the received videoconferencing stream with the identified metadata into a new videoconferencing stream. The receiving site 100 may present the new video conferencing stream using videoconferencing equipment 106.

Site 100 represents any location suitable to transmit, receive, and/or relay videoconferencing streams. For example, site 100 may be located in a conference room in an office, a room of a residence, or in an unenclosed space, such as a park or stadium. In addition to participants 104, system 10 may use other items existing in the background of a videoconferencing stream transmitted from a site 100 to identify metadata associated with that stream as described in further detail below. Additionally, system 10 may rely on sources external to the received videoconferencing stream to identify metadata.

Network 102 may be any suitable communication network. By way of example, network 102 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. Network 102 may include any combination of gateways, routers, hubs, switches, access points, base stations, and any other hardware, software, or a combination of the preceding that may implement any suitable protocol for communication.

A particular site 100 includes any number of participants 104 who may engage in a videoconference facilitated by system 10. In the embodiment illustrated in FIG. 1, site 100a has two participants 104a. Site 100b has three participants 104b. Site 100c has one participant 104c. Participants 104 may participate in several ways. For example, a particular participant 104 may act as a speaker such that some portion of a transmitted videoconferencing stream includes the voice of the particular participant 104. As another example, a particular participant 104 may appear in some portion of a transmitted videoconferencing stream without actively speaking. Throughout the course of a videoconference, a participant may appear and speak simultaneously, appear without speaking, and/or speak without appearing in a transmitted videoconferencing stream. Note also that a particular site 100 may include any number of non-conference participants who may assist in presentation of the received video conferencing streams with identified metadata.

Videoconferencing equipment 106 facilitates videoconferencing among participants 104. Videoconferencing equipment 106 may include any suitable elements to establish and facilitate the videoconference. For example, videoconferencing equipment 106 may include microphones, speakers, video cameras, displays, speakerphones, telephones, audio Internet Protocol (IP phones), video phone appliances, personal computer (PC) based video phones, streaming clients, a conferencing agent, and/or equipment sufficient to implement a Cisco TelePresence System or any other suitable system. In the illustrated embodiment, videoconferencing equipment 106 at the various sites 100 may include microphones 108, speakers 110, cameras 112, displays 114, and a conferencing agent 116.

Microphones 108 include any suitable hardware and/or software to facilitate capturing sound generated at a particular site 100 and transmitting all or a portion of that sound to participants 104 located at other sites 100. For example, the sound captured by microphones 108 may include voices of individual participants 104.

Speakers 110 include any suitable hardware and/or software to facilitate generating audio at a particular site 100. For example, audio generated at a particular site 100 may include audio from video conferencing streams received from other sites 100. As another example, audio generated at a particular site 100 may include audio metadata associated with video conferencing streams received from other sites 100 and identified in accordance with the principles described in this disclosure.

Cameras 112 include any suitable hardware and/or software to facilitate capturing an image stream at a site 100 and transmitting the image stream as a part of a videoconferencing stream to other sites 100. For example, the image stream captured by cameras 112 may include images of participants 104 and/or other items located at a particular site 100.

Displays 114 include any suitable hardware and/or software to facilitate displaying a video conferencing stream to participants 104. For example, video conferencing streams displayed by display 114 may include participants 104 from other sites 100 and/or metadata associated with those participants 104. Display 114 may include a notebook PC or a wall-mounted display. Display 114 displays an image portion of a video conferencing stream using any suitable technology and/or protocol.

In certain embodiments, conferencing agent 116 may have administrative control over the videoconferencing capabilities for a particular site 100. For example, conferencing agent 116 for a particular site 100 may initiate videoconferences with other sites 100 and facilitate receipt/transmission of videoconferencing streams from/to other sites 100. Conferencing agent 116 may also facilitate the identification and presentation of metadata associated with received videoconferencing streams. During a videoconference, conferencing agent 116 may direct videoconferencing equipment 106 to carryout certain functions.

Conferencing agent 116 includes any suitable hardware, software, or both that operate to control and process videoconferencing streams. For example, conferencing agent 116 may comprise a programmable logic device, a microcontroller, a microprocessor, any suitable processing device, or any combination of the preceding. Conferencing agent 116 may also comprise an interface for communicating information and signals to and receiving information and signals from network 102. This interface may be any port or connection, real or virtual, including any suitable hardware and/or software that allows videoconferencing equipment 106 to exchange information and signals with network 102, other videoconferencing equipment 106, and/or other elements of system 10. Conferencing agent 116 is operable to identify metadata from any suitable source and present that metadata during a videoconference. The discussion corresponding to FIG. 2 will describe details of an example embodiment of conferencing agent 116.

In an example embodiment of operation of system 10, participants 104a, participants 104b, and participants 104c engage in a videoconference using their respective videoconferencing equipment 106. Participants 104a at site 100a receive videoconferencing streams from site 100b and site 100c. Videoconferencing equipment 106a at site 100a includes two displays 114. Videoconferencing equipment 106a may be configured to display the stream received from site 100b on one display 114 and display the stream received from site 100c on the other display 114.

During the videoconference, the stream received from site 100c depicts its lone participant 104c. Conferencing agent 116 may use any suitable information source to identify metadata. For example, conferencing agent 116 may identify certain metadata from an entry in a calendaring or videoconferencing system database. This may be done before or during the videoconference.

In certain embodiments, conferencing agent 116 at site 100a analyzes the stream using face recognition software to determine the identity of the lone participant 104c. Conferencing agent 116 may use the determined identity to identify certain information to be displayed with the video conferencing stream as metadata. For example, it may use the identity to determine that participant 104c works for a certain company with a specific area of expertise. Conferencing agent may gather this information from a local database located at site 100a or may gather this information from a remote database accessible through network 102. In real-time, conferencing equipment 106a may display the stream from site 100c with the identified metadata.

Conferencing agent 116 at site 100a may also analyze the stream received from site 100b. When the videoconference begins, the stream received from site 100b depicts one of the three participants 104b. Conferencing agent 116 uses face recognition technology to determine the identity of the particular participant 104b depicted and display metadata associated with that participant. At a point in the videoconference, two of the three participants 104b are depicted at the same time. Conferencing agent 116 operates to identify both of the depicted participants 104b. Conferencing agent 116 at site 100a identifies and displays the names of the depicted participants 104b as metadata in close proximity to their displayed personas, such that viewing participants 104a appreciate and associate the identified metadata with the appropriate participants 104b. Each conferencing agent 116 at each site 100 may perform similar analysis, identification, and presentation for each of the videoconferencing streams it receives automatically, over the duration of the video conference. As used in this document, "each" refers to each member of a set or each member of a subset of a set.

Modifications, additions, or omissions may be made to system 10 as disclosed herein without departing from the scope of the invention. For example, system 10 may include any suitable number of sites 100. As another example, sites 100 may include any suitable number of cameras 112 and displays 114. The components of the systems and apparatuses may be integrated or separated. Moreover, the operations of the systems and apparatuses may be performed by more, fewer, or other components. For example, the operations of microphone 108 and camera 112 may be performed by one component, or the operations of conferencing agent 116 may be performed by more than one component. Additionally, operations of the components of system 10 may be performed using any suitable logic comprising software, hardware, and/or other logic.

Figure 2:
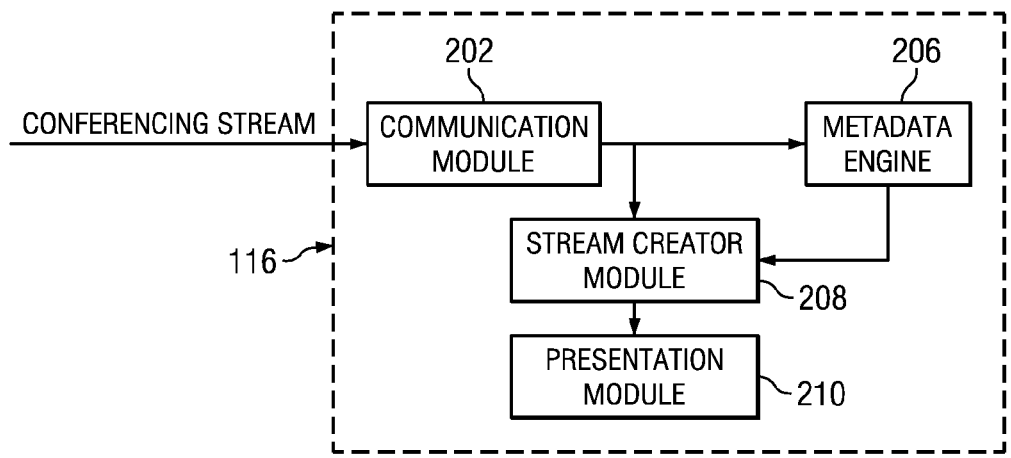
FIG. 2 is a block diagram of an example embodiment of a conferencing agent of the system of FIG. 1.

FIG. 2 is a block diagram of an example embodiment of conferencing agent 116. The illustrated embodiment shows the conferencing agent 116 receiving one or more videoconferencing streams from one or more external sources through a communication module 202. Conferencing agent 116 identifies metadata using a metadata engine 206. A stream creator module 208 incorporates the identified metadata and the received videoconferencing stream. A presentation module 210 facilitates presentation of the stream created by stream creator module 208 in any suitable format.

Communication module 202 includes any suitable hardware, software, or both that operate to receive video conferencing streams from external sources, such as other sites 100. Communication module 202 may receive one or more video conferencing streams in any suitable format and according to any suitable protocol. In certain embodiments, communication module 202 also facilitates transmission of a video conferencing stream created at a particular site 100 to other sites 100.

Metadata engine 206 includes any suitable hardware, software, or both sufficient to identify metadata associated with a videoconferencing stream. For example, metadata engine 206 may identify metadata, such as the name of conference participants or a topic of discussion, in an e-mail or a calendar entry associated with the videoconference. As another example, a person may provide metadata directly to conferencing agent 116. Certain identified metadata may lead metadata engine 206 to identify more metadata. For example, identifying the name of a participant in an e-mail may lead metadata engine 206 to access a vCard of a particular participant. The vCard may contain the name of the business of the participant, which may be presented as metadata during the videoconference. Conferencing agent 116 may use the name of the business to identify an industry associated with the business, which may lead to the identification of other metadata, such as news articles, stock prices, and information streams (e.g., stock tickers and news feeds).

The use of a specific order in the previous example should not be seen to limit the scope of the present disclosure. Metadata may be identified in any suitable order at any suitable time. For example, metadata may be identified before the videoconference begins and/or as a part of a startup sequence for the videoconference. During the videoconference, metadata engine 206 may identify metadata from analyzing any received or transmitted videoconferencing streams. Additionally, metadata engine 206 may identify metadata from participants 104 from other sites sent along with or separate from a videoconferencing stream.

In certain embodiments, metadata engine 206 may identify a full name of a participant 104. Metadata engine 206 may use this full name to identify alternative names of the participant 104, such as a nickname or former name. Where used to interview a potential employee, metadata engine 206 may access all or portions of the potential employee's resume. In certain implementations, metadata engine 206 may use the identity of the participant to access a business card for the identified participant. Metadata engine may also identify a business profile associated with the participant's business. In some cases, metadata engine may access a competitive analysis of several companies in the same business as the identified participant 104. Metadata engine 206 may coordinate with stream creator module 208 to insert the name of the identified participant 104 along with other information, such as associated business, business profile, etc., into a newly created videoconferencing stream as metadata.

Other types of metadata are possible as well. For example, metadata engine 206 may determine the originating location of a videoconferencing stream and access information about that location. Metadata engine 206 may access information on nearby shipping vendors, post offices, or banks in a videoconference where a participant 104 needs to send a package or a money order to a participant 104 at another site 100. Metadata engine 206 may coordinate with stream creator module 208 such that a transmitting site's location and information associated with that location are inserted as metadata into a newly created videoconferencing stream.

As another example, metadata engine 206 may analyze a video conferencing stream to identify metadata associated with the stream. The analysis of the videoconferencing stream may be performed in any suitable way. Several non-limiting examples are described below.

Metadata engine 206 may perform face and/or voice recognition to identify attributes suitable to identify a person. Face recognition may comprise gathering information from the image portion of a received videoconferencing stream. Metadata engine 206 may compare the gathered information to facial information stored in a database (not shown in FIG. 2). In certain embodiments, metadata engine 206 may employ a pattern recognition algorithm to associate an image with information stored in the database. The algorithm may require comparison of certain points of an image to certain points of images stored in the database. If a certain number of points of the image from the videoconferencing stream match the associated points of an image in a database, a face may be identified. In an example implementation, a "match" may comprise determining that any difference between a point in an image from the stream and an image from the database is within an acceptable threshold.

Voice or speech recognition may comprise gathering information from an audio portion of a received videoconferencing stream. Metadata engine 206 may compare gathered attributes from the received stream to voice or speech information stored in a database. Similar to face recognition, metadata engine 206 may perform pattern recognition and comparison until it finds a match in the database. Upon finding an unrecognized voice or speech pattern, metadata engine 206 may store attributes associated with the voice or speech pattern in a database as a new pattern. A participant 104 may then associate the new pattern with a particular person. As a variation on this type of analysis, a broader acoustic analysis may analyze the sounds of a videoconference to identify things other than a particular person. For example, an acoustic analysis may comprise identifying a song or instrument being played in the background of a videoconference.

Location recognition may comprise image recognition, audio recognition, or some combination of the two. For example, metadata engine 206 may compare the images and/or sounds in a received videoconferencing stream to image and sound information in a database. When metadata engine 206 finds a match in the database, it associates the received videoconferencing stream with a location associated with the match in the database.

One or more of these techniques may be applied to analyze a received videoconferencing stream. For example, metadata engine 206 may perform both voice and facial recognition to identify a person. The algorithm employed by the metadata engine 206 may give any desired weight to the individual recognition techniques when determining the identity of the person in the stream. In some cases, a person speaking at a particular time during the videoconference may be different than the person that appears in the stream. In those cases, metadata engine 206 may be configured to identify both the currently "speaking" participant and the currently "appearing" participant. Metadata engine 206 may coordinate with stream creator module 208 to ensure that presented metadata distinguishes between the two.

In addition to analyzing received videoconferencing streams, metadata engine 206 may also analyze transmitted videoconferencing streams. Analysis of both received and transmitted video conferencing streams may be useful when performing subject matter recognition or when performing conversational dynamics analysis.

Subject matter or topic recognition may comprise some combination of image and/or audio recognition. For this type of analysis, metadata engine 206 associates spoken words or displayed images with subject matter or a topic of conversation. Metadata engine 206 may identify words or images spoken in both received and transmitting streams in order to identify the subject matter of conversation. The subject matter of the conversation may change over time. Thus, metadata engine 206 may identify several topics over the course of entire videoconference. Metadata engine 206 may further identify specific metadata associated with this subject matter such that it may be presented to participants at a local site when a specific topic is being discussed.

For conversational dynamics analysis, metadata engine 206 may perform some combination of image and/or audio recognition. For this type of analysis, metadata engine 206 may identify specific facial expressions and/or voice inflections, as non-limiting examples. These identified facial expressions and/or voice inflections may be associated with various predefined rules. For example, the specific rules may associate certain expressions and/or gestures with a "stressed" state or a "dishonest" state. These may be useful, for example, when an employer is interviewing a potential employee or when a business is evaluating a potential supplier via videoconference. Analyzing both received and transmitting videoconferencing streams allows metadata engine 206 to use conversational dynamics analysis to determine which participant is "dominant" or "passive" in a conversation. A participant may use this information as a cue to maintain or modify a certain conversational style in real-time during a videoconference in accordance with a desired result.

Metadata engine 206 may perform its functions at various times before or during a videoconference. For example, it may analyze a videoconferencing stream only once near the beginning of a videoconference to identify all the conference participants. As another example, metadata engine 206 may analyze a videoconferencing stream periodically or according to some predetermined schedule. The period set for periodic analysis may be set relatively small such that an analysis occurs seemingly instantaneously (i.e., in real-time) relative to a changing videoconferencing stream. Metadata engine 206 may also perform its functions in response to a sufficient change in the stream. For example, metadata engine 206 may detect that a different participant is speaking that prompts it to do further or different types of analysis (e.g., face or image recognition). A participant 104 at a local site 100 may also direct metadata engine 206 to analyze a videoconferencing stream on-demand, i.e. at any desired point during a videoconference.

As described above, metadata engine 206 may identify metadata associated with an identified subject matter or with the dynamics of a conversation to be presented during the videoconference. As an example, metadata engine 206 may operate to show statistics regarding sales of laptops where metadata engine 206 has identified laptops or laptop features as the subject matter of the conversation. Where configured to display metadata associated with conversational dynamics analysis, metadata engine 206 may access information related to the various emotional states identified by metadata engine 206. This information may be displayed as metadata at a site 100 that receives a videoconferencing stream. In this example, metadata engine 206 identifies metadata as a result of an analysis of one or more received and/or transmitted videoconferencing streams, however, metadata may be identified from any suitable source. Metadata engine 206 may access a local database to identify metadata associated with a video conferencing stream. Locally stored business cards may be one such example. Metadata engine 206 may also access remote databases, or other information sources, such as those stored in the Internet or somewhere in network 102, to identify metadata associated with a videoconferencing stream. For example, metadata engine may access a profile of a participant 104 stored on a website, such as LinkedIn or Facebook. Metadata engine 206 may also search news databases/websites or general search engines, such as Google, to collect information. This information may then be processed in any suitable way. For example, this information may be presented directly, parsed to extract pertinent information, operated on to produce a different format (e.g., creation of a table of gathered data), or included as a database keyword to access information in other databases that may be presented as metadata. The results of any of the preceding may be presented as metadata.

Metadata engine 206 may accept input from a person to carryout their functions. This person may be a participant 104 or a non-conference participant, e.g. an executive assistant. In any case, the input may come from a person at any site 100 or beyond. This input may be in the form of finally displayed metadata, such as a name of a participant 104. Alternatively, this input may be in the form of criteria for identifying attributes and metadata. For example, a person may direct metadata engine 206 and/or metadata engine 206 to use a certain database or certain thresholds when performing face, voice, or location recognition.

Stream creator module 208 includes any suitable hardware, software, or both that operate to incorporate received videoconferencing streams and identified metadata into a combined video conferencing stream in any suitable manner. The combined video conferencing stream may include information not previously present in the received videoconferencing stream. Stream creator module 208 coordinates with presentation module 210 to combine received videoconferencing streams with identified metadata and to present them to participants 104 at a particular site 100. Stream creator module 210 may do this by creating a second video conferencing stream to be displayed at a particular site.

Presentation module 210 includes any suitable hardware, software, or both that operate to present a combined videoconferencing stream to participants 104 at a particular site 100. Presentation module 210 may direct videoconferencing equipment 106 to present the appropriate information in accordance with the description provided for video conferencing equipment above with respect to FIG. 1. For example, any portion or all of the identified metadata may be presented during a videoconference. Presentation may be by any suitable manner, such as displaying metadata overlaid on top of the received videoconferencing stream or on a separate display. In certain embodiments, metadata may appear as bulleted points in a presentation-style format. As another example, metadata may be presented as audio at a particular site.

Modifications, additions, or omissions may be made to conferencing agent 116 disclosed herein without departing from the scope of the invention. For example, the operations of the metadata engine 206 may be performed by multiple components. Additionally, the operations of stream creator module 208 and presentation module 210 may be performed by one component. As another example, conferencing agent 116 may include local memory for storing and accessing metadata.

Figure 3:
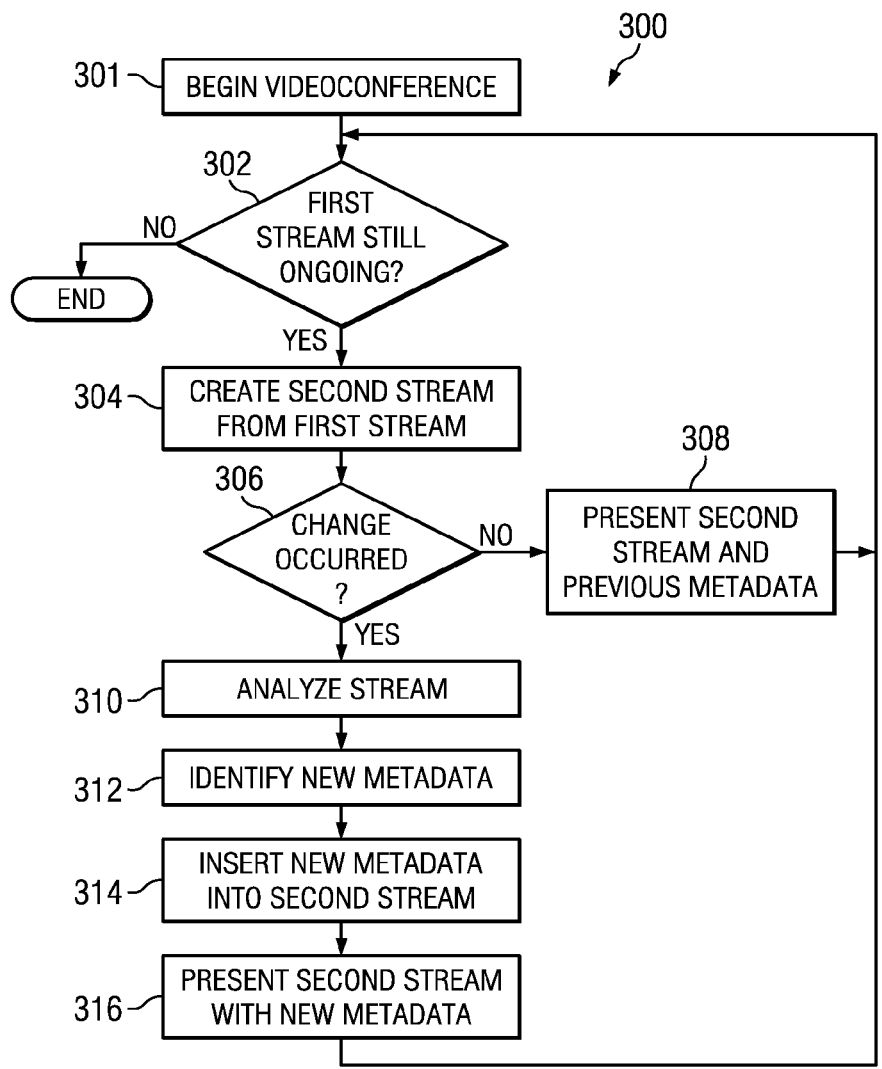
FIG. 3 is a flowchart of an example method for presenting metadata associated with a videoconferencing stream received at a site.

FIG. 3 is a flowchart of an example method 300 for presenting metadata associated with a videoconferencing stream. The method begins at step 301, where a videoconference begins. During this step, one or more sites, such as sites 100, may begin transmitting and receiving videoconferencing streams. Certain metadata may be identified before or during the startup process for the videoconference as described above with respect to FIG. 2.

At step 302, it is determined whether a videoconferencing stream is still being received. If not, the method ends. If the videoconferencing stream is still on-going, a second videoconferencing stream is created from the received stream at step 304. In certain embodiments, the second stream may be a duplicate of the received stream. At step 306, the method determines whether a change has occurred in the received stream. Example changes include a change from one speaker to another speaker, a change from one person being displayed to another person being displayed, or a change in the subject matter of the conversation of the video conference. If no change has occurred, the second stream is presented with any previously identified metadata at step 308. The second stream may also present continually changing metadata such as a stock ticker or news ticker. The stock ticker or news ticker may be inserted into the received videoconferencing stream to create a new stream. The method then loops back to step 302.

If it is determined that a change has occurred at step 306, the received and/or transmitted stream is further analyzed to identify attributes associated with the stream at step 310. Examples of the types of analysis that may be performed are described above with respect to metadata engine 206. In coordination with the analysis performed in step 310, new metadata associated with the received stream is identified at step 312. This step may also involve determining whether metadata currently presented is now stale or irrelevant, such that it should be removed from the second videoconferencing stream. At step 314, the newly identified metadata is incorporated into the second stream. The method continues by presenting the second stream including the newly identified metadata at step 316. The method then loops back to step 302.

Modifications, additions, or omissions may be made to method 300 without departing from the scope of the invention. The methods may include more, fewer, or other steps. For example, method 300 may include a step for determining whether a participant has requested an analysis to be performed on-demand. Method 300 may also include a step where input is accepted from participants 104 or non-conference participants. As another example, method 300 may exclude step 306. For example, method 300 may indentify metadata periodically according to a predetermined schedule. Additionally, method 300 may identify metadata using a transmitted videoconferencing stream in addition to or instead of any received videoconferencing streams. In certain embodiments, method 300 may identify metadata without analyzing the content of any videoconferencing stream. In these embodiments, method 300 may identify metadata from other sources, such as an e-mail, business card or vCard, or any other suitable source. Additionally, steps may be performed in any suitable order. For example, a second videoconferencing stream may be created in step 304 after determining whether a change has occurred at step 306.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more non-transitory computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for presenting metadata during a video conference, comprising:
receiving a first video conferencing stream from a first site;
identifying metadata associated with the first video conferencing stream by performing face, voice, or location recognition;
creating, using a processor, a second video conferencing stream incorporating the identified metadata, wherein the identified metadata comprises a name of a first person being displayed;
presenting the second video conferencing stream at a second site;
identifying a topic being discussed in the first video conferencing stream and a third video conferencing stream originating from the second site based at least in part on image recognition performed on the first video conferencing stream and the third video conferencing stream to facilitate identifying the topic being discussed in the first video conferencing stream and the third video conferencing stream;

detecting a change that occurs in the first video conferencing stream from the first person being displayed to a second person being displayed;

automatically identifying, in a database remote from the second site, supplemental metadata associated with the first video conferencing stream according to the change and according to the identified topic being discussed in the first video conferencing stream and the third video conferencing stream;

updating, using the processor, the second video conferencing stream incorporating the identified supplemental metadata, wherein the supplemental metadata comprises a name of the second person being displayed; and presenting the updated second video conferencing stream at the second site.

2. A method for presenting metadata during a video conference, comprising:

receiving a first video conferencing stream from a first site;

identifying metadata associated with the first video conferencing stream;

creating, using a processor, a second video conferencing stream incorporating the identified metadata and the first video conferencing stream;

identifying a topic being discussed in the first video conferencing stream and a third video conferencing stream originating from a second site based at least in part on image recognition performed on the first video conferencing stream and the third video conferencing stream to facilitate identifying the topic being discussed in the first video conferencing stream and the third video conferencing stream;

identifying supplemental metadata associated with the first video conferencing stream received from the first site in response to detecting a change in the first video conferencing stream and according to the identified topic being discussed in the first video conferencing stream and the third video conferencing stream; and presenting the second video conferencing stream with the supplemental metadata at the second site.

3. The method of claim 2, wherein analyzing the first video conferencing stream comprises performing face, voice, or location recognition.

4. The method of claim 2, the method further comprising identifying metadata in a database remote from the second site.

5. The method of claim 4, wherein the database remote from the second site comprises at least a portion of a website.

6. The method of claim 2, wherein identifying metadata associated with the first video conferencing stream comprises receiving input from a person.

7. The method of claim 2, wherein presenting the second video conferencing stream comprises displaying the identified metadata on a display.

8. The method of claim 2, wherein the identified metadata comprises information associated with dynamics of a conversation.

9. The method of claim 2, wherein presenting the second video conferencing stream comprises playing audio metadata at the second site.

10. A non-transitory computer readable medium storing logic, the logic operable when executed by one or more processors to:

receive a first video conferencing stream from a first site;

identify metadata associated with the first video conferencing stream;

create, using a processor, a second video conferencing stream incorporating the identified metadata and the first video conferencing stream;

identify a topic being discussed in the first video conferencing stream and a third video conferencing stream originating from a second site based at least in part on image recognition performed on the first video conferencing stream and the third video conferencing stream to facilitate identifying the topic being discussed in the first video conferencing stream and the third video conferencing stream;

identify supplemental metadata associated with the first video conferencing stream received from the first site in response to detecting a change in the first video conferencing stream and according to the identified topic being discussed in the first video conferencing stream and the third video conferencing stream; and present the second video conferencing stream with the supplemental metadata at the second site.

11. The non-transitory computer readable medium of claim 10, wherein the analysis comprises face, voice, or location recognition.

12. The non-transitory computer readable medium of claim 10, wherein the identified metadata comprises information associated with dynamics of a conversation.

13. The non-transitory computer readable medium of claim 10, wherein the logic is further operable to play audio metadata at the second site.

14. A system for presenting metadata during a video conference, comprising:

a communication module operable to receive a first video conferencing stream from a first site;

a metadata engine operable to:

identify metadata associated with the first video conferencing stream;

identify a topic being discussed in the first video conferencing stream and a third video conferencing stream originating from a second site based at least in part on image recognition performed on the first video conferencing stream and the third video conferencing stream to facilitate identifying the topic being discussed in the first video conferencing stream and the third video conferencing stream; and identify supplemental metadata associated with the first video conferencing stream received from the first site in response to detecting a change in the first video conferencing stream and according to the identified topic being discussed in the first video conferencing stream and the third video conferencing stream;

a stream creator module operable to create, using a processor, a second video conferencing stream incorporating the identified metadata and the first video conferencing stream; and a presentation module operable to present the second video conferencing stream at the second site with the supplemental metadata.

15. The system of claim 14, wherein the analysis comprises face, voice, or location recognition.

16. The system of claim 14, wherein the identified metadata comprises information associated with dynamics of a conversation.

17. The system of claim 14, wherein the presentation module is further operable to play audio metadata at the second site.

18. The method of claim 1, wherein analyzing the first video conferencing stream and the third video conferencing stream to identify the topic comprises performing image recognition on the first video conferencing stream and the third video conferencing stream to facilitate identifying the topic being discussed in the first video conferencing stream and the third video conferencing stream.

19. The method of claim 2, further comprising presenting the second video conferencing stream with the supplemental metadata at the second site while receiving the first video conferencing stream and in response to detecting the change in the first video conferencing stream.

20. The non-transitory computer readable medium of claim 10, the logic further operable to present the second video conferencing stream with the supplemental metadata at the second site while receiving the first video conferencing stream and in response to detecting the change in the first video conferencing stream.

21. The system of claim 14, the presentation module further operable to present the second video conferencing stream at the second site with the supplemental metadata while receiving the first video conferencing stream and in response to detecting the change in the first video conferencing stream.

\* \* \* \* \*